United States Patent [19]

Kobayashi et al.

[11] 4,404,683

[45] Sep. 13, 1983

[54] BLOOD CELL IDENTIFICATION AND CLASSIFICATION SYSTEM

[75] Inventors: Shigeki Kobayashi, Otsu; Norio Iwasaki, Ichikawa; Yasunori Ikeda, Kameoka; Tamio Miyake; Shigeru Tanimura, both of Kyoto, all of Japan

[73] Assignee: Omron Tateisi Electronics Co., Kyoto, Japan

[21] Appl. No.: 195,869

[22] Filed: Oct. 10, 1980

[30] Foreign Application Priority Data

Oct. 24, 1979 [JP] Japan .................................. 54-138156

[51] Int. Cl.³ .............................................. G06K 9/00
[52] U.S. Cl. ........................................ 382/6; 358/107;
358/335; 364/416; 382/57
[58] Field of Search ................. 358/4, 10, 56, 93, 107,
358/127, 139, 903, 310, 335, 342; 235/92 PC;
340/146.3 CA; 356/39-42; 364/413, 416, 200
MS File, 900 MS File; 360/33.1, 9.1, 131, 133,
135; 382/6, 57

[56] References Cited

U.S. PATENT DOCUMENTS

| | | | |
|---|---|---|---|
| 3,883,852 | 5/1975 | Cotter | 364/900 |
| 3,922,532 | 11/1975 | Kitchener et al. | 235/92 PC |
| 4,048,616 | 9/1977 | Hart et al. | 356/39 |
| 4,093,849 | 6/1978 | Baxter, Jr. et al. | 235/92 PC |
| 4,097,845 | 6/1978 | Bacus | 364/416 |
| 4,115,804 | 9/1978 | Morton et al. | 358/107 |
| 4,198,656 | 4/1980 | Mathisen | 358/335 |

OTHER PUBLICATIONS

Megla, "An Automatic White Blood Cell Analyzer", SID Jornal, vol. 11, No. 5, pp. 20–22, Sep.-Oct. 1974.
Gregory et al., "A Software-Based Television Image-Analysis System", SMPTE Journal, vol. 88, Feb. 1979, pp. 117–118.

Primary Examiner—Leo H. Boudreau
Attorney, Agent, or Firm—Wegner & Bretschneider

[57] ABSTRACT

There is provided a blood cell identification and classification system including a photographing means for producing magnified images of cells in blood smears and generating video signals and an automatic analytical means for analyzing cells based on said video signals, characterized in that said system comprises: a video recording means for recording on a collective basis the magnified images of unknown cells which could not be analyzed by said automatic analytical means in conjunction with identification data for smears to which said unknown cells pertain, a video reproduction means for reproducing the magnified images of unknown cells and identification data so recorded, and an input means for entering analytical data derived from the magnified images of unknown cells so reproduced.

5 Claims, 8 Drawing Figures

BLOOD CELL IDENTIFICATION AND CLASSIFICATION SYSTEM

BACKGROUND OF THE INVENTION

The present invention relates to a blood cell identification and classification system, and more particularly to an improved system which has a photographing means for producing magnified images of cells in blood smears and generating video signals and an automatic analytical means for analyzing cells based on said video signals.

There are known several systems for the counting and analysis of blood cells. In such analytical systems, a magnified image of blood cells is photographed with a color television camera and a set of video signals corresponding to red, green and blue light wavelengths is obtained from the camera. The video signal set is processed in a central processing unit (hereinafter referred to briefly as CPU) to automatically perform a classification of white blood cells or a morphological analysis of red blood cells, or to count blood platelets. If there are blood cells which the CPU has failed to automatically identify and classify (such cells will be referred to as unknown cells), the unknown cells are played back on a monitor color picture tube after completion of analysis of the particular blood smear and the laboratory specialist in charge identifies these unknown cells and enters the results into the CPU. Since this identification of unknown cells by the hematologist or the like is conventionally performed for each blood specimen, the hematologist has to be available in front of the analytical system from the beginning to the end of analysis, thus imposing a serious restriction on the efficiency of hematological analysis.

OBJECTS AND SUMMARY OF THE INVENTION

The present invention has as its principal object to provide a cell identification system which permits an identification by a laboratory specialist of only unknown cells which have not been identified by automatic analysis of blood cell specimens.

Another object of this invention is to provide a cell identification system which permits a positive and accurate identification by a laboratory specialist of all the unknown cells contained in each blood smear.

In accordance with this invention, there is provided:
a blood cell identification and classification system having a photographing means for producing magnified images of cells in blood smears and generating video signals and an automatic analytical means for analyzing cells based on said video signals, characterized in that said system comprises, a video recording means for recording on a collective basis the magnified images of unknown cells which could not be analyzed by said automatic analytical means in conjunction with identification data for smears to which said unknown cells pertain, a video reproduction means for reproducing the magnified images of unknown cells and identification data so recorded, and an input means for entering analytical data derived from the magnified images of unknown cells so reproduced.

The above and other objects, as well as advantages, of this invention will be apparent from the following detailed description and the accompanying drawings.

DETAILED DESCRIPTION OF THE INVENTION

Figure 1:
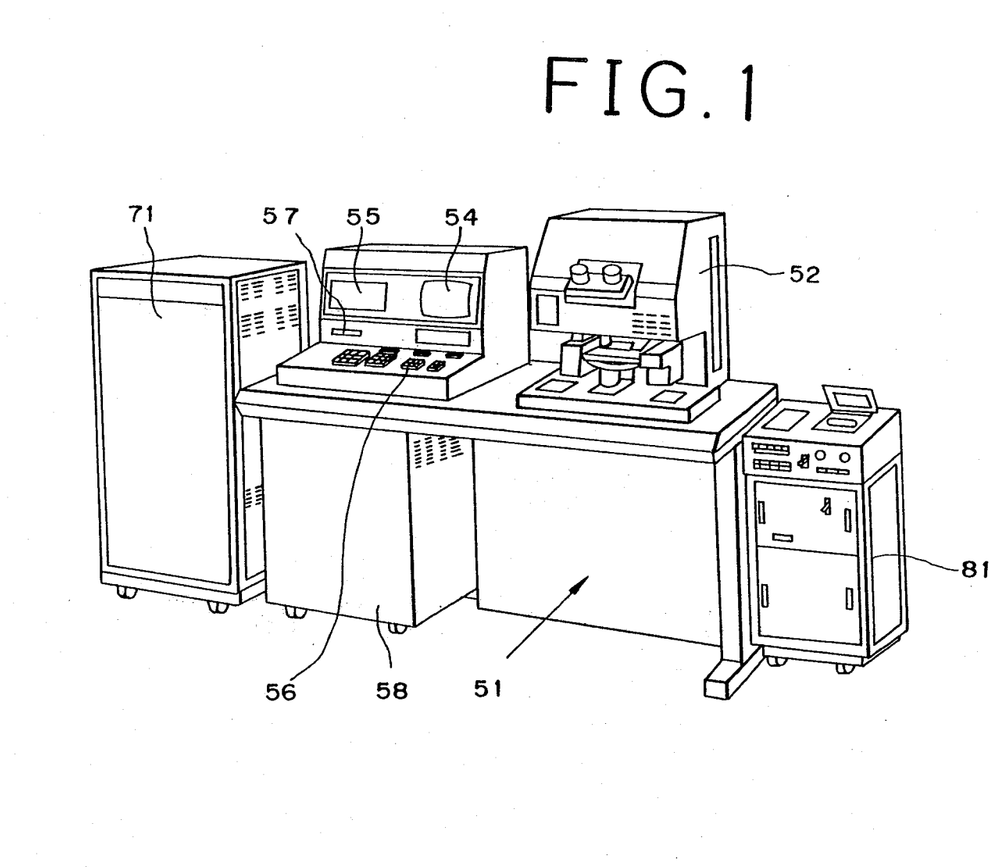
FIG. 1 is a perspective exterior view showing a cell identification system embodying this invention.

FIG. 1 shows a cell identification and classification system embodying the principles of this invention. This system performs an automatic classification of white blood cells, an automatic morphological analysis of red blood cells and an automatic counting of platelets using blood smears as specimens. Referring to FIG. 1, the automatic cell identification system comprises a central control unit or operation unit 51, an automatic microscope 52 and a color TV camera (FIG. 2, 53) both mounted at the top right of said unit, and a monitor color TV 54 (hereinafter referred to simply as the monitor), a display 55, a keyboard 56 and a printing paper outlet 57, all at the left top of the unit 51. A control box 58, which is located under the central control unit, includes a CPU 59 and other controllers which will be described hereinafter in detail. There is disposed a data processing unit 71 on the left-hand side of the central control unit 51, and a video reproduction unit or picture unit 81 on the right-hand side.

Figure 2:
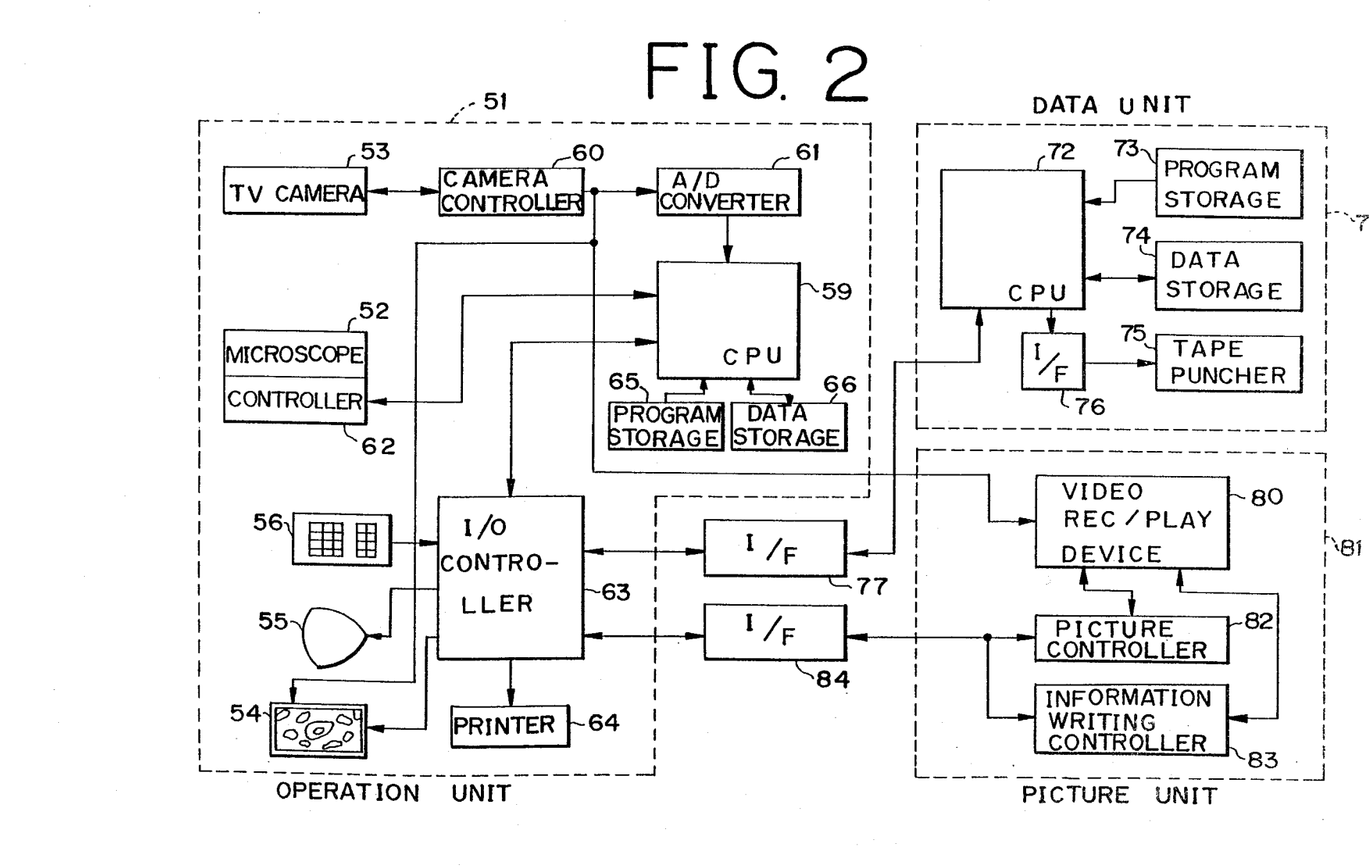
FIG. 2 is a block diagram showing the general construction of said cell identification system.

Referring to FIG. 2, the automatic microscope 52 is controlled by CPU 59 and control element 62 in such a manner that the position of the stage of said microscope is adjusted so that any detected white blood cell in a blood smear will be brought into a center of the field of view of the microscope and automatically focused. The magnified image having a specified expanse centered around the white blood cell is photographed by the color TV camera 53, which is a photographing element, where the transmitted light outputs at red, green and blue wavelengths are converted to electric signals as an output video signal. This television camera 53 is controlled by a cemera controller 60. The above-mentioned video signal is transmitted to the monitor unit 54, where said magnified image is projected on the monitor screen. At the same time, the magnified image is transformed into a digital picture data by an A-D converter 61 and sent to CPU 59. The CPU 59 has a program storage 65 and a data storage 66, and performs an analytical cell identification operation according to an execution program stored in said program storage 65. The picture information from the A-D converter 61 is stored in the data storage 66.

The CPU 59 is capable of classifying white blood cells, analyzing red blood cells, and counting platelets. In the classification of white blood cells, the CPU 59 analyzes the leukocyte picture image stored in storage 66 to separate the nucleus from the cytoplasm and compute the area of nucleus, the area of cytoplasm, the shape index of nucleus, the aspect (area) ratio of nucleus to cytoplasm the color index of cytoplasm, etc., and based on such data, classifies white blood cells into six kinds of normal white blood cells (stab neutrophil, filamented neutrophil, eosinophil, basocyte, lymphocyte and monocyte) and 3 kinds of abnormal white blood cells (lymphoblast type, juvenile type and atypical lymphocyte type). As for red blood cells and platelets, the picture information at the monitor 54 as a whole is processed in the same manner as for white blood cells so that the data on the red blood cells and platelets are extracted. The red blood cells are morphologically analyzed for number, shape, size and depth of stain. The platelets are counted.

Upon completion of analyses for white blood cells, red blood cells or/and other blood elements in the field, the stage of the microscope is shifted so as to look for the next white cell, for instance and the same procedure as above is executed. As the number of white blood cells identified has reached a preset examination number, the analysis of the particular blood smear is completed.

The keyboard 56 is designed for entry of the identification number of each blood smear, the typology of white blood cells as identified by the laboratory specialist, the video reproduction instruction and other instructions. The display 55 indicates the results of analyses and may for example be a plasma display unit. The printer 65 is adapted to imprint the results of analyses. The keyboard 56, display 55, monitor 54 and printer 64 are connected to the CPU 59 through an input-output controller 63.

A data processor 71 executes the processing of data on unknown cells which have not been identified by the CPU 59, the summation and editing of final results of analysis and the outputting of edited information, and includes a CPU. This CPU 72 is connected to the input-output controller 63 and, therefore, to the CPU 59 through an interface 77. The CPU 72 has a program storage 73 containing an execution program and a data storage 74 for storing results of analysis. The data processor 71 is provided with a tape puncher 75 for outputting final results of analysis and connected to the CPU 72 via an interface 76.

The video reproduction unit 81 is adapted to record the pictures of unknown cells, store identification data including the identification number of the smear to which the unknown cells pertain and reproduce the pictures on the monitor screen 54, and includes a video recording-reproduction device 80. The recording and reproduction of video signals by this device 80 is controlled by a picture controller 82 and the recording of identification numbers is accomplished by a write-in controller 83. These controllers 82 and 83 are connected to the input-output controller 63 through an interface 84. The video signal to be recorded is sent from the camera controller 60 to the video recording and reproduction device 80 and the video signal to be reproduced is sent from this device 80 to the monitor 54. The video tape for the recording and reproduction device 80 is preferably of the cassette type.

Figure 3:
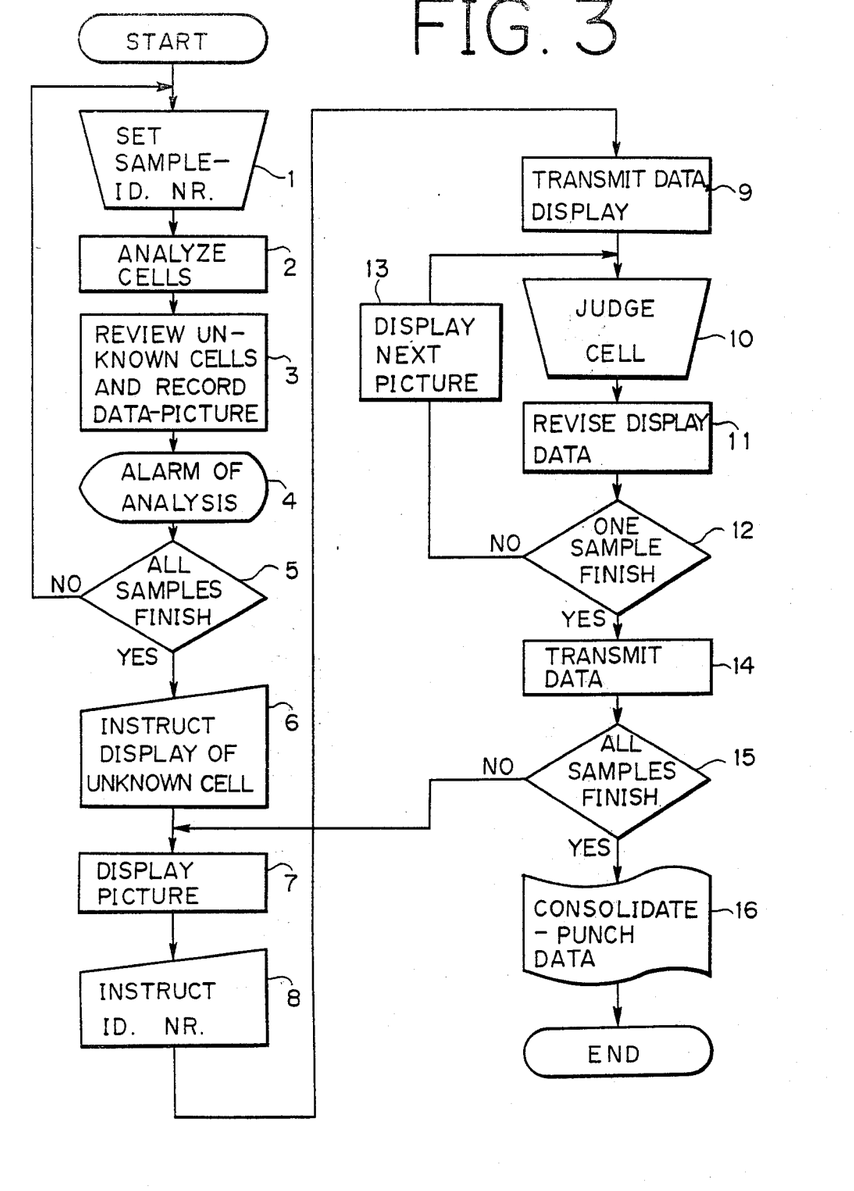
FIG. 3 is a flow chart showing the operational and functional sequence of the same system.

The general functions of the above-described cell identification system as well as the operations performed by the operator and laboratory specialist such as a hematologist or cytologist are illustrated in FIG. 3. Referring to FIG. 3, the operator in charge of the system sets a blood-smear specimen in position on the stage of the microscope 52 and enters the identification number of the same blood smear at the keyboard 56 (Step 1), whereupon the CPU 59 starts executing the aforementioned automatic classification of white blood cells, automatic morphological classification of red blood cells, etc. (Step 2). In such analyses, the result of each analysis is displaced on the display 55 and when unknown cells are present, their number is indicated. Each time an unknown cell appears in the field of the microscope, the coordinates of the unknown cell in the blood specimen are memorized. And when the number of analyzed white blood cells has reached a present examination number (e.g. 100, 200, 500 or 1000), an intermediate result of analysis exclusive of data on unknown cell is printed out by the printer 64. At the end of analysis of any given blood smear, the results of analysis of all white and red blood cells and the number of unknown cells are appearing on the display 55. On completion of analysis of each blood smear, a review procedure over unknown cells insure (Step 3). Since the coordinates of unknown cells have already been memorized, the stage of the microscope is driven to reposition each unknown cell within the field of the microscope and the picture of the unknown cell is reproduced on the monitor 54 for a predetermined time period. When a plurality of unknown cells are present, these cells are reviewed sequentially. At this review operation, the identification number of the blood smear to which such unknown cells belong is fed to the data processor 71 and video recording-reproduction unit 81. Intermediate analytical data are sent to the processor 71 and stored in the data storage 74, while the video signal of the unknown cell under review is sent to the unit 81 which records it together with the identification number on the video tape of recorder 80. When no unknown cell is present, the identification number and analytical data are sent to the data processor 71 and stored therein. On completion of the above review of unknown cells, an alarm informing of a completion of analysis of the particular blood smear is produced (Step 4). Thereupon, the operator in charge enquires whether the analyses of all smears have been completed (Step 5) and if there is any residual blood smear to be analyzed, the sequence returns to Step 1 and the setting of another smear on the microscope stage and the inputting of its identification number are performed. The procedure of Steps 1 to 5 is thus repeated until all the smears have been analyzed and only then, the identification of unknown cells is performed.

Since the procedure of Steps 1 to 5 do not require a knowledge of cytology, it can be delegated to an operator with no background of cytology or hematology. However, the subsequent procedure involves judgements on unknown cells and, therefore, must be dealt with by a laboratory specialst. Of course, the procedure of Steps 6 et seq. need not be performed immediately after the analysis of all smears (Steps 1 to 5).

As the laboratory specialist enters an instruction to reproduce the pictures of unknown cells at the keyboard 56 (Step 6), the video signal of a first one of the unknown cells is sent from the video recording-reproduction unit 81 to the monitor 54 where the picture of the unknown cell and the identification number of the relevant smear are reproduced on the screen. The laboratory specialist identifies the identification number on the monitor screen 54 and enters the same number at the keyboard 56 Step 8, whereupon the intermediate analytical data on the smear carrying the particular identification number is sent back from the data processor 71 and displayed on the display 55 (Step 9). The specialist views the picture on the monitor 54 and enters his judgement through the keyboard 56 (Step 10). The CPU 59 adds this inputted data to the intermediate data already stored and displays the total data on the display 55 (Step 11). The reproduction and judgement of such pictures of unknown cells are performed for each blood smear, and where any single smear contains a plurality of unknown cells, the reproduction and judgement of pictures are repeated until all such plural unknown cells have been identified. After Step 11, it is enquired whether the reproduction for the particular smear has been completed (Step 12) and if not, the picture of the next unknown cell is reproduced on the monitor 54 (Step 13). Thus, as the judgement of the unknown cell is entered by the laboratory specialist (Step 10), the data is added and displayed as described above (Step 11). The steps 10 to 13 are repeated in the above manner and on completion of all the procedures for any given blood smear, the Step 12 proceeds to Step 14 and the final data on the particular smear is sent to the data processor 71 (Step 14). It is enquired if the judgements of unknown cells for all the available smears have been completed and if not, the procedure returns to Step 7 and the picture reproduction and judgement of unknown cells for the next smear are performed (Steps 7 to 12). In this manner, the procedure of Step 7 to Step 14 is repeated and when the procedures for all the smears have been completed, the operation proceeds from Step 15 to Step 16. In this step 16, the CPU 72 edits the final analytical results by percentage and other computations and the puncher 75 outputs the edited results in a punched tape format.

The system described above may be modified in such a manner that in Step 3 the number of unknown cells for each smear is recorded on the video tape at recording device 80, that in Step 10 the operations of judgement input keys corresponding to different kinds of unknown cells at the keyboard 56 are counted and that in Step 12 it is enquired if the count agrees with the recorded number of unknown cells. In this modified system, the sequence proceeds to Step 14 when the above agreement exists.

Figure 8:
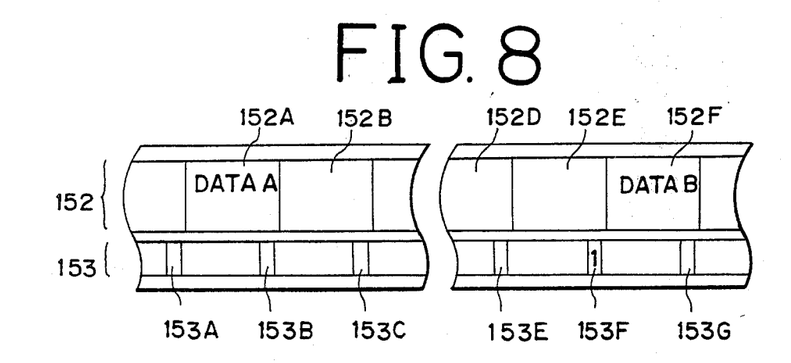
FIG. 8 shows an exemplary record of data on the video tape used in the system of FIG. 1.

FIG. 8 shows a typical example of data to be recorded on the video tape. Referring to FIG. 8, the video tape has a video track 152 and a sound track 153. The video track 152 carries records relating to each blood smear in areas 152A and 152F and unknown cell video signals in areas 152B to 152E. As data relating to the blood smear, the number of unknown cells is also recorded. Thus, for example, DATA A may contain the information that 4 unknown cells (152B to 152E) are present. The sound track is a playback motion controlled signal track and carries, for example, Signal "1" at 153F, which indicates that DATA B relating to the next smear has been recorded in the next frame 152F.

In another modification of the system described hereinbefore, there is provided a D-A converter coupled to the A-D converter 61 and the video signal of a cell which has been judged by the CPU 59 as an unknown cell is recorded as an analog signal in the recording device 80 by reconverting the digital signal from the A-D converter 61 to an analog signal in the D-A converter. Thus, the picture signal from the camera 53 is digitalized by the A-D converter and, after a judgement procedure at CPU 59, is reconverted by the said D-A converter and recorded in the unit 80. In this arrangement, once the camera 53 has sent the picture signal to the converter 61, the camera is available for photographing the next cell while said picture signal is being analyzed by CPU 59, thus contributing to an increased processing speed.

In the embodiments described hereinbefore, the central control unit 51 and the video unit 81 are disposed adjacent to each other and the monitor 54, display 55 and keyboard 56 are utilized also for the picture reproduction and judgement of unknown cells. The monitor, display and keyboard may be positioned on the video unit 81, in which case the video unit 81 may be installed at a remote location from the central control unit 51. In this case, a video recording unit for unknown cells is provided on the control unit and the video tape at the recording unit carries the video signals of unknown cells, the identification number of the smear to which the unknown cells pertain and the intermediate automatic analysis data on the smear.

Figure 4:
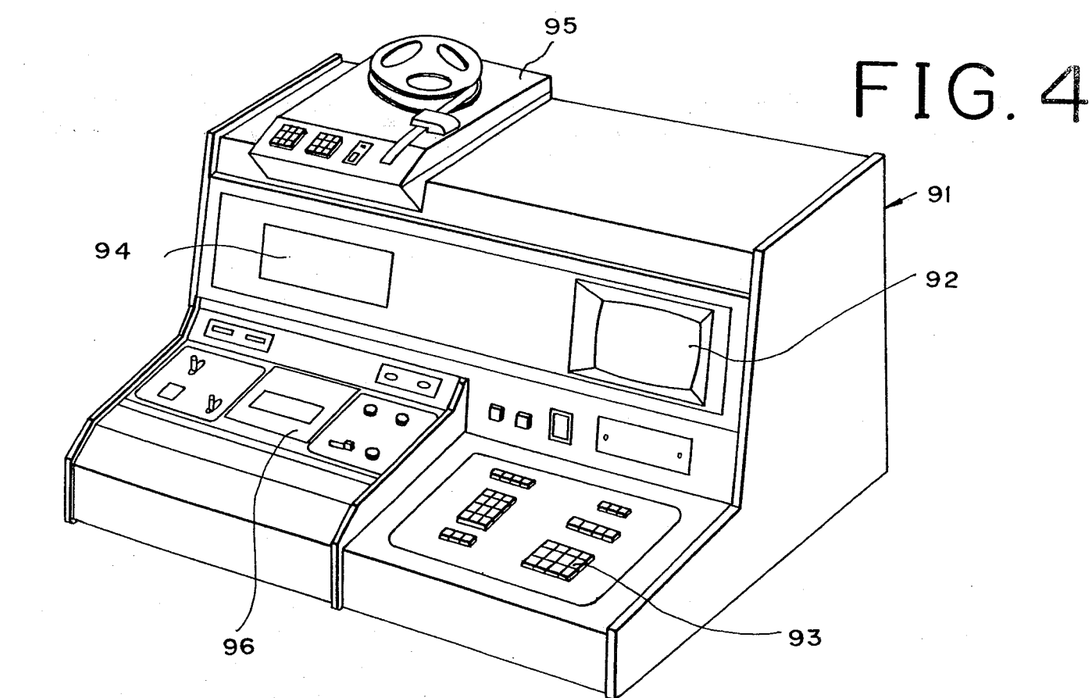
FIG. 4 is a perspective exterior view showing a video processing unit having a monitor, display and keyboard, which can be utilized in association with the cell identification system shown in FIG. 1.
Figure 5:
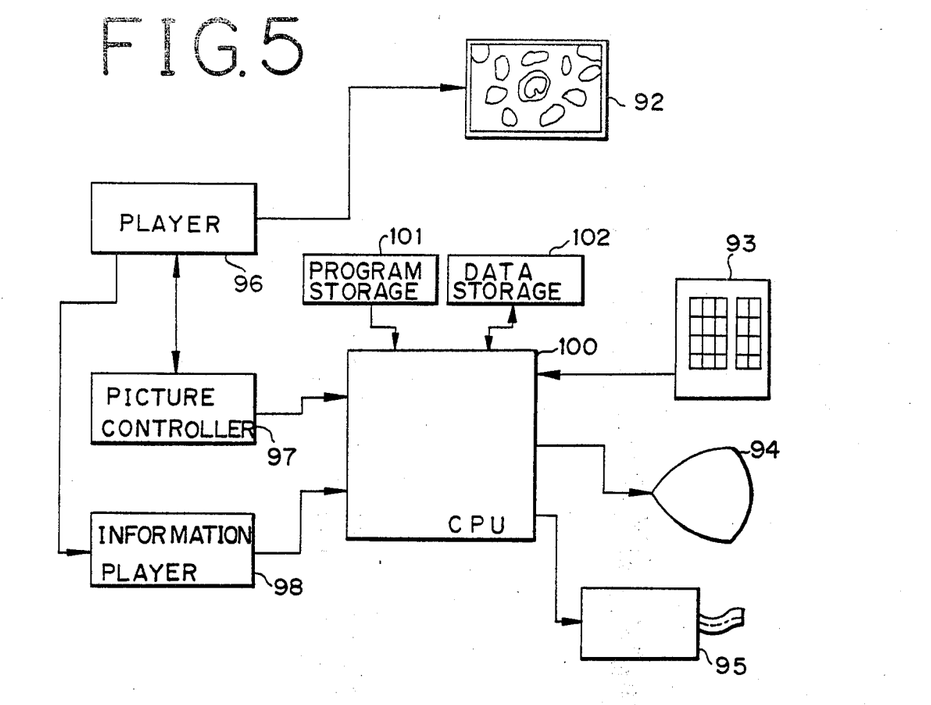
FIG. 5 is a block diagram showing the construction of the same video processing unit.

FIGS. 4 and 5 shows a video unit 91 including a monitor, display and keyboard, which can be installed remotely from the central control unit and permits the picture reproduction and judgement of unknown cells. Referring to FIGS. 4 and 5, a video processor 91 includes a taped video signal and data reproduction means 96. The reproduced video signal of any unknown cell is sent to a monitor 92 and the identification number and intermediate data signal for the smear relating to the unknown cell are fed to an information reproduction unit or player 98. The data reproduction unit or player 96 is controled by a video control unit 97. The video processor 91 has a CPU which controls these reproduction devices, receives inputs from a keyboard and outputs data to a display 94 and a puncher 95. A CPU 100 functions in accordance with a program stored in a program storage 101. The CPU 100 includes a data storage 102 for storing analytical data. A keyboard 93 is provided with 10-keys and keys for inputting the judgements on unknown cells. The video tape for recording the video signals of unknown cells is preferably of the cassette type.

Figure 6:
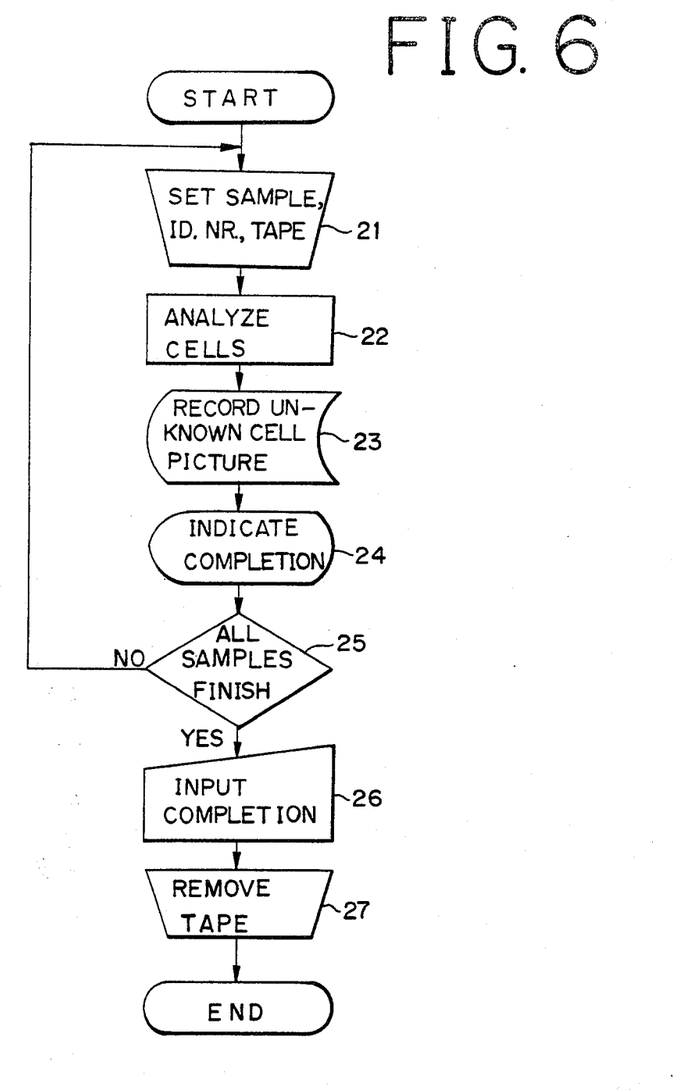
FIG. 6 is a modified flow chart showing the automatic cell identification operational and functional sequence based on FIG. 3.

The sequence of automatic blood cell analysis procedures at the central control unit of FIG. 1 for the above-mentioned video processor 91 is, as illustrated in FIG. 6, substantially similar to the sequence of Steps 1 to 5 shown in FIG. 3. Thus, the operator sets a blood smear to be examined on the stage of the microscope and enters the identification number of the smear. At the same time, he sets a video tape on the recording unit at the central control unit (Step 21), whereupon the CPU at the central control unit starts functioning to execute the above-described classification of white blood cells, morphological analysis of red blood cells, etc. on the smear positioned on the microscope stage. Upon completion of the automatic analysis, the recording unit records the identification number and the intermediate automatic analysis results on the video tape. It further records the video signals relating to unknown cells (Step 23). After the recording step, an alarm is issued to remind the operator of a completion of the procedure for one smear (Step 24). If the completion of analysis of all the available smears (Step 25) has not been realized, the sequence returns to Step 21 and the above-described procedure is repeated. When all the smears have been analyzed, the fact is inputted (Step 26) and the video tape is taken off (Step 27).

Figure 7:
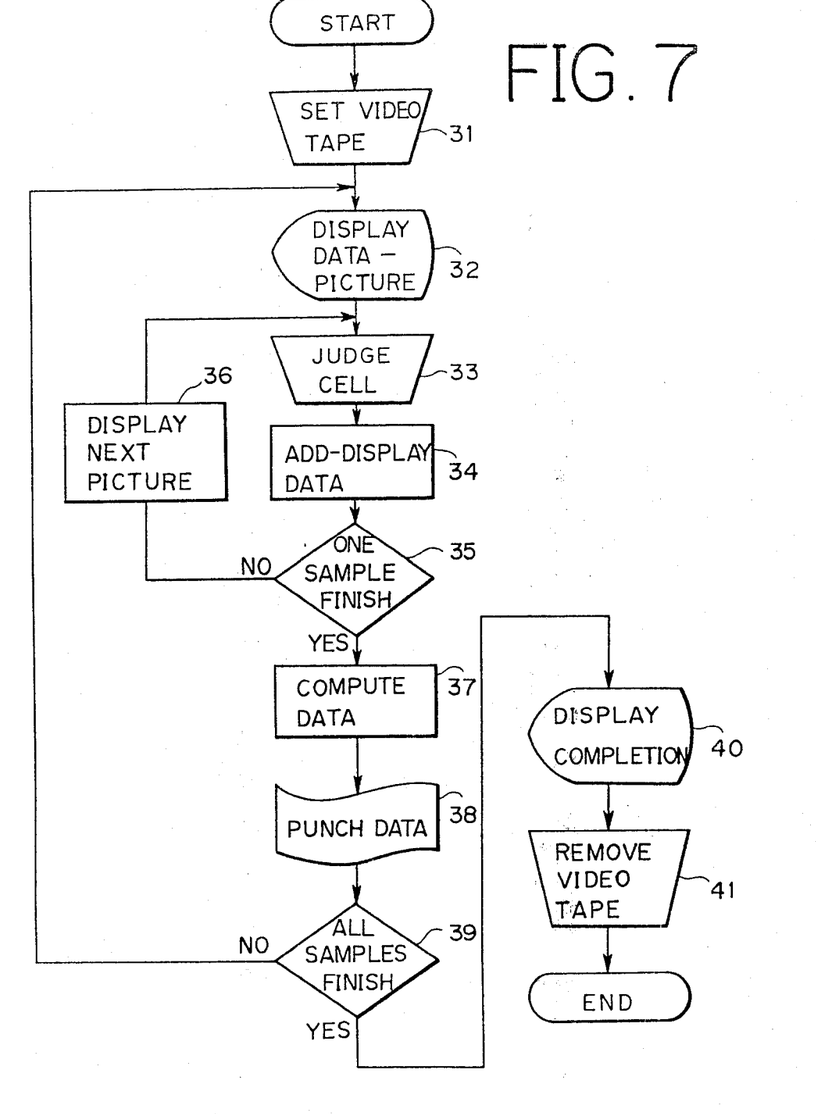
FIG. 7 is a flow chart showing the picture reproduction and judgement operational and functional sequence for unknown cells at the video processing unit of FIG. 4.

The sequence of picture reproduction and judgement of unknown cells by the video processor 91 is shown in FIG. 7. The video tape removed at Step 27 is reset and played back on the reproduction unit 96 (Step 31), whereby the identification number and intermediate analysis data relating to the first smear are displayed on the display 94 and the picture of the unknown cell contained in the smear is reproduced on the monitor 92 (Step 32). The laboratory specialist assesses the picture of the cell on the monitor 92 and enters his judgement at the keyboard 93 (Step 33). Thereupon, the judgement data is added to the above-mentioned intermediate data and the total result is displayed on the display 94 (Step 34). Then, an enquiry is made if all the unknown cells in the particular smear have been duly assessed (Step 35) and if any unknown cell remains unidentified, the picture of the cell is reproduced on the monitor 92 (Step 36) and the sequence returns to Step 33. The procedure from Step 33 to Step 36 is repeated for all the unknown cells in any given smear and on completion of the procedures for each smear, the sequence proceeds to Step 37 where the final analytical data are edited by calculation of percentages, etc. (Step 37), and the final results are reduced to punched tape records by the puncher 95 (Step 38). The procedure from Step 32 to Step 38 is repeated for each of the remaining smears, and when the picture reproduction and judgement of all the smears have been completed (Step 39), the end of the procedure is displayed (Step 40). The laboratory specialist removes the video tape from the reproduction unit (Step 41), which completes the entire operation. It will be readily apparent that the above system is advantageous in that since all the data and pictures of unknown cells are recorded on a video tape which is dismountable, the picture reproduction and assessment of unknown cells can be performed at an optional time.

Thus, in accordance with this invention, video signals of unknown cells which cannot be automatically identified or classified in a plurality of smears can be collectively recorded so that after an automatic analysis of all the smears, the laboratory specialist can evaluate and classify these unknown cells at a time and any time that may be convenient. Moreover, the automatic phase of analysis can be delegated to an operator without a cytological background. Since this operator is freed from the evaluation job requiring a professional acuity, he is now able to operate several automatic analyzing instruments without interfering with the quality of cellular examinations.

It is to be understood that the invention is not limited to the specific devices and steps hereinabove described, but may be carried out in other ways without departure from its spirit.

What is claimed is:

1. A blood cell identification and classification system having a photographing means for producing magnified images of cells in blood smears and generating video signals and an automatic analytical means for analyzing cells based on said video signals, characterized in that said system comprises:
   a video recording means for recording on a collective basis the magnified images of unknown cells which could not be identified by said automatic analytical means in conjunction with identification data for smears to which said unknown cells pertain,
   a video reproduction means for reproducing the magnified images of unknown cells and identification data so recorded, and
   an input means for entering analytical data derived from the magnified images of unknown cells so reproduced.

2. A blood cell identification and classification system according to claim 1 which is further characterized in that said system includes an operational means for adding data entered by said input means to analytical data from said automatic analytical means so as to provide total data.

3. A blood cell identification and classification system according to claim 1 which is further characterized in that said video recording means is adapted to record analytical data generated by said automatic analytical means on cells identified and classified by said automatic analytical means.

4. A blood cell identification and classification system according to claim 1 which is further characterized in that said system includes:
   a memory means for storing the cordinates of unknown cells in smears in sequence as each unknown cell appears in the course of automatic analysis and
   a means which, after completion of analysis of a predetermined number of cells or blood elements, reads out the cordinates of unknown cells stored in said memory means in sequence and brings back said unknown cells one by one in the field of view of said photographing means.

5. A blood cell identification and classification system according to claim 1 which is further characterized in that said identification data includes the identification number of each smear and the information representing the number of unknown cells in the corresponding smear, that said input means includes judgement input keys corresponding to different types of unknown cells and that said video reproduction means is so adapted that when the number of operations of said judgement input keys has become equal to the number of said unknown cells reproduced, it starts reproducing the next smear.

* * * * *